(12) United States Patent
Lumezanu et al.

(10) Patent No.: US 9,143,452 B2
(45) Date of Patent: Sep. 22, 2015

(54) DATA PROCESSING

(71) Applicant: NEC Laboratories America, Inc., Princeton, NJ (US)

(72) Inventors: Cristian Lumezanu, East Windsor, NJ (US); Anupam Das, Champaign, IL (US); Yueping Zhang, Princeton, NJ (US); Vishal Kumar Singh, Princeton, NJ (US); Curtis Yu, San Gabriel, CA (US); Guofei Jiang, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 250 days.

(21) Appl. No.: 13/973,254

(22) Filed: Aug. 22, 2013

(65) Prior Publication Data

US 2014/0064066 A1     Mar. 6, 2014

Related U.S. Application Data

(60) Provisional application No. 61/694,406, filed on Aug. 29, 2012.

(51) Int. Cl.
| | |
|---|---|
| *H04L 12/28* | (2006.01) |
| *H04L 12/56* | (2006.01) |
| *H04L 12/801* | (2013.01) |
| *H04L 12/715* | (2013.01) |
| *H04L 12/751* | (2013.01) |

(52) U.S. Cl.
CPC ............... *H04L 47/12* (2013.01); *H04L 45/02* (2013.01); *H04L 45/64* (2013.01)

(58) Field of Classification Search
CPC .......... H04L 47/12; H04L 45/02; H04L 45/64
USPC ............. 370/389, 392, 252, 253, 254; 398/25
See application file for complete search history.

(56) References Cited

U.S. PATENT DOCUMENTS

| | | | |
|---|---|---|---|
| 2003/0065986 A1* | 4/2003 | Fraenkel et al. ................ | 714/47 |
| 2004/0052527 A1* | 3/2004 | Kirby .............................. | 398/57 |
| 2009/0074414 A1* | 3/2009 | Miles et al. ..................... | 398/75 |
| 2010/0214920 A1* | 8/2010 | Tewani et al. ................. | 370/232 |
| 2011/0038633 A1* | 2/2011 | DeCusatis et al. ............. | 398/79 |
| 2012/0023546 A1* | 1/2012 | Kartha et al. ..................... | 726/1 |
| 2012/0167168 A1* | 6/2012 | Orr et al. .......................... | 726/1 |
| 2013/0145002 A1* | 6/2013 | Kannan et al. ................ | 709/223 |
| 2013/0227558 A1* | 8/2013 | Du et al. ........................... | 718/1 |

(Continued)

OTHER PUBLICATIONS

Mohammad Al-fares, Sivasankar Radhakrishnan, Barath Raghavan, Nelson Huang, and Amin Vandat, "Hedera: Dynamic flow scheduling for data center networks," in Proc. USENIX NSDI, Apr. 2010.

(Continued)

*Primary Examiner* — Chuong T Ho
(74) *Attorney, Agent, or Firm* — Joseph Kolodka

(57) ABSTRACT

A method implemented in a network apparatus used in a network is disclosed. The method comprises collecting information about network topology from a network controller, collecting information about data movement, deciding routing in the network according to the information about network topology and the information about data movement, and providing information about the routing to the network controller, wherein the network controller enforces the routing in the network. Other methods, apparatuses, and systems also are disclosed.

15 Claims, 5 Drawing Sheets

(56) References Cited

U.S. PATENT DOCUMENTS

2013/0290957 A1* 10/2013 Li et al. .................. 718/1
2014/0226975 A1* 8/2014 Zhang et al. .............. 398/25

OTHER PUBLICATIONS

Ganesh Ananthanarayanan, Srikanth Kandula, Albert Greenberg, Ion Stoica, Yi Lu, Bikas Saha, and Edward Harris, "Reining in the Outliers in Map-Reduce Clusters using Mantri," in Proc. USENIX OSDI, 2010.

Sameer Agarwal, Srikanth Kandula, Nicolas Bruno, Ming-Chuan Wu, Ion Stoica, and Jingren Zhou, "Re-optimizing Data Parallel Computing," in Proc. USENIX NSDI, 2012.

Paolo Costa, Austin Donnelly, Antony Rowstron, and Greg O'Shea, "Camdoop: Exploiting In-network Aggregation for Big Data," in Proc. USENIX NSDI, 2012.

\* cited by examiner

DATA PROCESSING

This application claims the benefit of U.S. Provisional Application No. 61/694,406, entitled "FlowComb: Boosting Big Data Processing with OpenFlow," filed on Aug. 29, 2012, the contents of which are incorporated herein by reference.

BACKGROUND OF THE INVENTION

The present invention relates to data processing and, more specifically, to boosting big data processing with the software defined network such as the OpenFlow network.

The Hadoop MapReduce platform is widely used in today's data-intensive applications deployed in various organizations such as governments, enterprises, and research organizations. However, the native task scheduler in Hadoop MapReduce assigns tasks to servers mainly based on the availability of the servers with limited consideration of the network situation. Moreover, MapReduce applications usually involves massive data movement across server racks and thus have high requirement of the performance of the underlying network infrastructure. As a consequence, the native Hadoop scheduler suffers from bursty network traffic, network congestion, and degraded application performance.

Existing efforts to enhance the performance of Hadoop MapReduce mainly focuses on modifying Hadoop's Job-Scheduler to take into account data locality and network congestion or improving its failure recovery and replication mechanisms. There is no existing work that addresses this problem from the network side.

We approach the problem from a completely new perspective. Specifically, we develop an intelligent network middleware, called FlowComb, that can dynamically and proactively change the routing of network flows to avoid network congestion based on real-time prediction of data movement between the Mappers, Reducer, and Hadoop Distributed File System (HDFS) nodes. One example of enabling technologies of FlowComb is OpenFlow, which allows in-flight routing reconfigurations of individual flows. Then, FlowComb is a middleware sitting between the OpenFlow controller and the Hadoop JobTracker. By retrieving data movement information from Hadoop JobTracker, FlowComb is able to identify network hotspots, change flow scheduling to resolve congestion, and then notify the OpenFlow controller to enforce the new flow scheduling.

References:

[1] Mohammad Al-fares, Sivasankar Radhakrishnan, Barath Raghavan, Nelson Huang, and Amin Vandat, "Hedera: Dynamic flow scheduling for data center networks," in Proc. USENIX NSDI, April 2010.

[2] Ganesh Ananthanarayanan, Srikanth Kandula, Albert Greenberg, Ion Stoica, Yi Lu, Bikas Saha, and Edward Harris, "Reining in the Outliers in Map-Reduce Clusters using Mantri," in Proc. USENIX OSDI, 2010.

[3] Sameer Agarwal, Srikanth Kandula, Nicolas Bruno, Ming-Chuan Wu, Ion Stoica, and Jingren Zhou, "Re-optimizing Data Parallel Computing," in Proc. USENIX NSDI, 2012.

[4] Paolo Costa, Austin Donnelly, Antony Rowstron, and Greg O'Shea, "Camdoop: Exploiting In-network Aggregation for Big Data," in Proc. USENIX NSDI, 2012.

BRIEF SUMMARY OF THE INVENTION

An objective of the present invention is to change the routing to avoid network congestion.

An aspect of the present invention includes a method implemented in a network apparatus used in a network. The method comprises collecting information about network topology from a network controller, collecting information about data movement, deciding routing in the network according to the information about network topology and the information about data movement, and providing information about the routing to the network controller, wherein the network controller enforces the routing in the network.

Another aspect of the present invention includes a non-transitory computer readable medium storing a program causing a computer to execute a process. The process includes collecting information about network topology from a network controller, collecting information about data movement, deciding routing in the network according to the information about network topology and the information about data movement, and providing information about the routing to the network controller, wherein the network controller enforces the routing in the network.

Still another aspect of the present invention includes a network comprising a network apparatus, and a network controller, wherein the network apparatus collects information about network topology from the network apparatus, collects information about data movement, decides routing in the network according to the information about network topology and the information about data movement, and provides information about the routing to the network controller, and wherein the network controller provides the information about network topology, creates a set of network rules to be installed in each switch according to information about the routing, and enforces the routing in the network.

DETAILED DESCRIPTION

FlowComb improves the throughput of the underlying network infrastructure and reduces the completion time of the Hadoop jobs. Leveraging the open-source channel of Hadoop and its existing customer/user base, FlowComb in turn can promote the deployment of OpenFlow.

Figure 1:
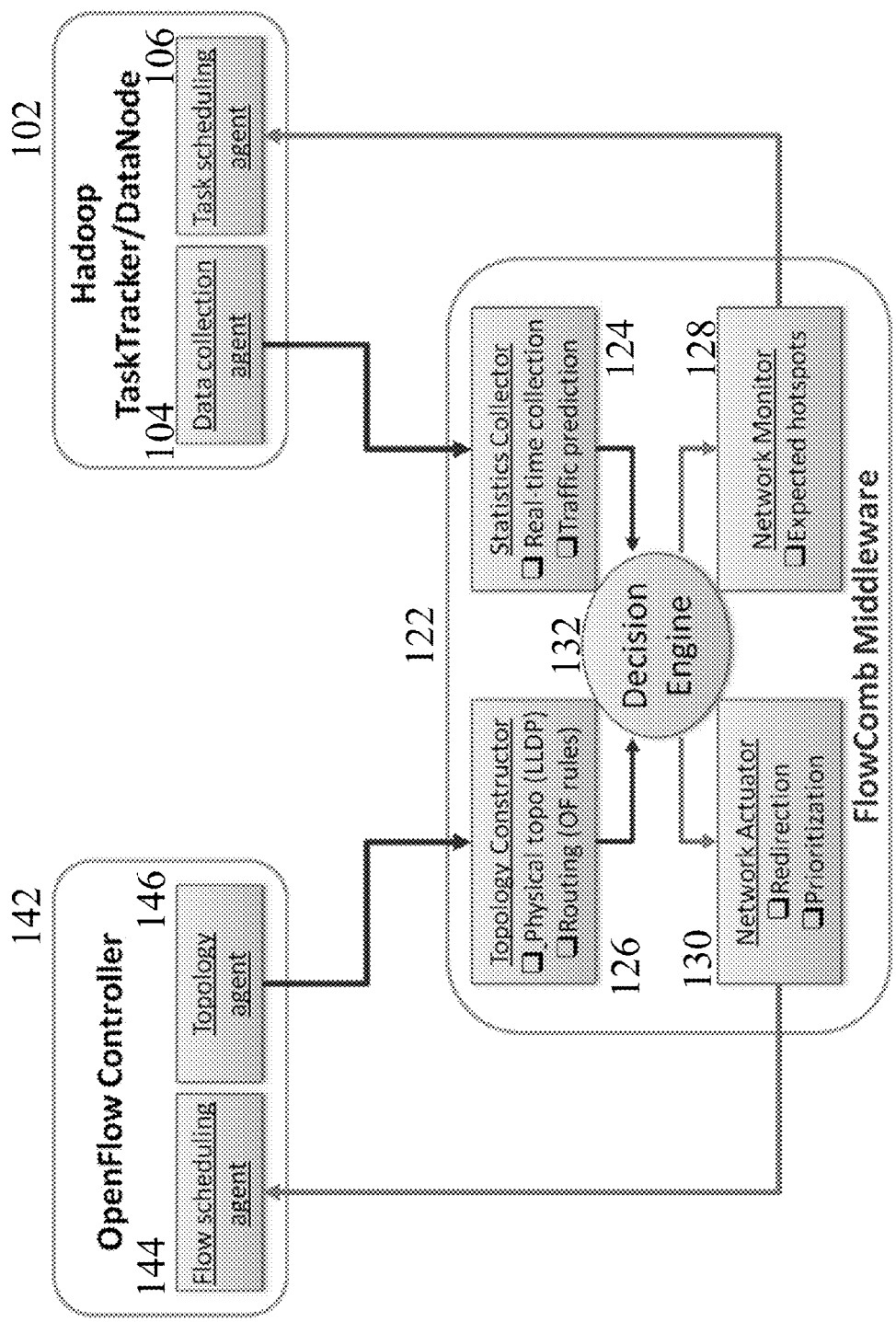
FIG. 1 depicts a block diagram of FlowComb.

As seen in FIG. 1, FlowComb comprises, for example, three components: Hadoop data collection agent 104, OpenFlow rule manager or flow scheduling agent 144, and the decision engine 132.

The data collection agent resides on the Hadoop platform or Hadoop TaskTracker/DataNode 102, and periodically collects the source/destination, data volume, and transfer progress of all network flows, including flows that have not started yet. One component of the data collection module 104 is an agent (more on this below) running on the Hadoop TaskTracker 102 that infers the upcoming data transfers and the data volume before the transfers actually take place.

The second component is the decision engine 132, which takes as input the network topology from topology agent 146 through topology constructor 126 and data movement prediction from data collection agent 104 through statistics collector 124, and then proactively provisions the network and resolves any potential network contention.

The actions (e.g., routing reassignment) generated by the decision engine is fed through network actuator 130 into the third component, OpenFlow rule manager or flow scheduling agent 144, which translates the actions into OpenFlow rules.

Hadoop TaskTracker/DataNode includes data collection agent 104 and task scheduling agent 106. FlowComb Middleware 122 includes statistics collector 124, topology constructor 126, network monitor 128, network actuator 130, and decision engine 132. OpenFlow controller includes flow scheduling agent 144 and topology agent 146. Network monitor 128 receives information from decision engine 132 about scheduled paths (e.g. which flow is scheduled on which path, for how long, and how much bandwidth it consumes) and an available bandwidth (e.g. how much space is available on each path for new flows) and informs task scheduling agent 106. Thus, task scheduling agent 106 can schedule future network intensive tasks with knowledge about potential network congestion.

Figure 2:
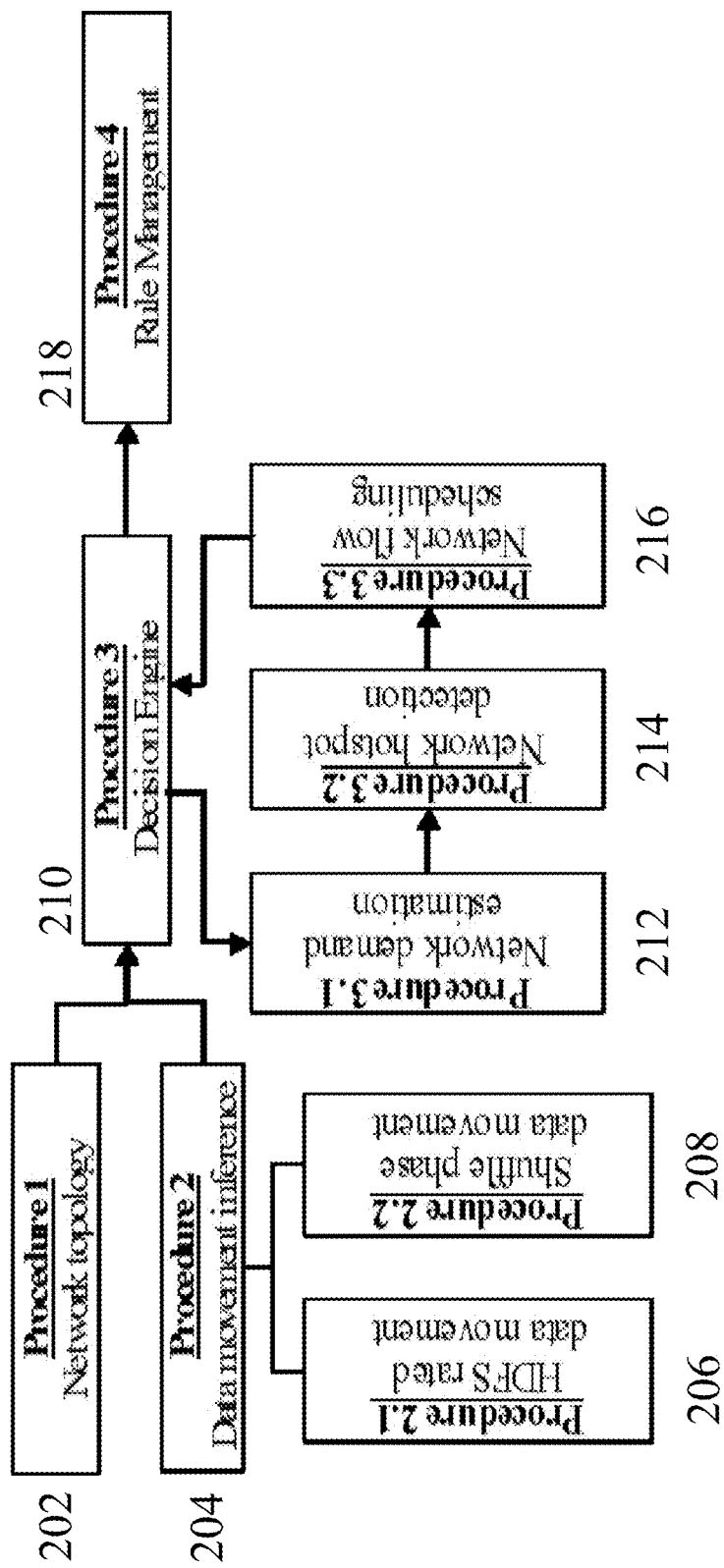
FIG. 2 depicts a process carried out by FlowComb.

A process carried out by FlowComb is illustrated in FIG. 2.

Procedure 1 (202): Network Topology and Endpoint Resolution

This procedure infers the physical network topology by sending Link Layer Discovery Protocol (LLDP) packets (specified in standards document IEEE 802.1AB) from each switch (to infer links between switches) and by examining OpenFlow rules installed on each switch (to infer to which switch is an endpoint connected).

A step here detects where on the network an endpoint is collected. We start with a switch that has a rule matching the endpoint IP (as a destination) and proceed in several ways. A) If the action of the rule is to forward to an out port, we follow the corresponding link. If the link is present in the topology then we select the destination switch of the link and repeat the process. If the link is not present in the topology, then we conclude it leads to the endpoint and infer that the endpoint is connected to the current switch. B) If the action of the rule is other than forward to an outport, we select another switch in the topology that has a rule that matches the endpoint IP as a destination.

Procedure 2 (204): Data Movement Inference

This procedure proactively infers the source/destination and data volume of Hadoop flows before the transfer actually happens. Data movements in Hadoop mainly occur during the following two operations in Hadoop:

Writing/Replicating data to HDFS

Shuffling map outputs to reducers

We use Procedure 2.1 (206) and Procedure 2.2 (208) to cope with these two situations, respectively.

Procedure 2.1 (206): HDFS Related Datamovement

Any form of update/modification in the HDFS goes through the NameNode. NameNode decides which DataNodes (i.e., workers) are responsible for storing which blocks. NameNode basically maintains tables containing information about which block belongs to which file (or Inode) and which block is stored in which Datanode, so that it can reconstruct the file when needed. Thus we can extract information about data writes to HDFS from the NameNode code.

By default any data block in HDFS is replicated three times for redundancy. The order in which these replications take place is calculated by finding a shortest path that starts from the writer and traverses all nodes.

The actual book keeping work for the NameNode may be performed by the FSNamesystem.java file (src/hdfs/server/namenode/FSNamesystem.java), which is the location where Hadoop keeps track of the data blocks exchanged among its nodes. This is the file that we may be able to instrument to discover how much traffic is a Hadoop node going to send, which may be useful to perform our optimization. All information regarding data replication locations is available inside the getAdditonalBlock( ) method in FSNamesystem.java. Thus, in this procedure, we instrument FSNamesystem.java and sent the data movement information contained in the getAdditonalBlock( ) method to a middleware (running on a different host) through a TCP connection.

Procedure 2.2 (208): Shuffle Phase Data Movement

In this procedure, we extract the data movement information during the Hadoop shuffle phase before the transfers take place. Before describing the details of this procedure, we first explain the mechanisms and characteristics of data movement in this phase.

Each mapper is responsible for a single split/block of data. So total number of map tasks is equal to (total input file size/block size). Reducers start after a certain fraction of the mappers finish (this argument can be set for Hadoop-version 0.21 and higher). By default a reducer retrieves map outputs from 5 mappers simultaneously and it also randomizes the order in which it selects the mappers. This is done in order to prevent a single mapper from being swamped with too much data transfer. Therefore predicting the exact order in which the map outputs are retrieved becomes really difficult. However; depending on our implementation we can make predictions with different ranges of error.

We next describe three alternative ways to gather data movement information during the shuffling phase.

1. Modify Reduce task code
2. Modify JobTracker code
3. Run agents continuously scanning log files Procedure 2.2.1 (not shown in FIG. 2): Modify Reduce Task Node The simplest way to gather information about shuffling phase data transfers is to modify the reduce task so that it reports to the middleware about each of the data transfer it plans to execute. This approach will give us a good prediction/estimation about when a data transfer is going to take place. But the drawback of this approach is that it requires modifying the code for the reduce task (ReduceTask.java) which runs on every slave node, potentially creating a problem for deployment.

Procedure 2.2.2 (not shown in FIG. 2): Modify JobTracker Node

Another option is to extract the required information from the JobTracker node. The JobTracker knows which map tasks are finished and it also knows when a reduce task instantiates. So we could potentially predict the source and destination of a data transfer. The advantage of this approach is that we only require modifying the code for JobTracker (JobInProgress.java) while leaving the code for slaves untouched. However the downside of this approach is that some of the predictions are made too early compared to when the actual transfer takes place. The main reason for this is that the order in which reducers fetch map output is randomized to avoid congesting map tasks.

Procedure 2.2.3 (not shown in FIG. 2): Run Agents that Continuously to Scan Log Files The third alternative requires no Hadoop code modification. In Hadoop reducers fetch map outputs through http servlets (called MapOutputServlet; inside TaskTracker code). So if we can retrieve the hostname/ip of map tasks we can basically extract information about about the shuffling phase data transfer. We therefore, implement agents that continuously scan JobTracker log files to determine which map tasks have completed their task. We then use this information to query (HttpServletRequest) the Tasktrackers on which maps were ran to retrieve the length of the map output for a given reduce task (determined by its partition ID). As described before each mapper partitions its output based on the number of reducer task and it stores its output locally. Reducers retrieve map output through HTTP protocol where the url contains the address of the mapper and the pardon id (same as the reducer id) to retrieve. Now a reducer can use this URL to send a http request to the mapper with the header field set to "Map-Output-Length". The HTTP server running on the mapper would then respond with the size of the map output requested by the reducer. Our agent basically constructs this url by determining which map tasks are finished and which reducer tasks have started; and it then sends out the http request to gather the shuffle phase data movement. Finally the agent sends this information to the middleware for processing. This approach requires no Hadoop code modification, but suffers the same fate as the second approach since reducers randomize the order is which they retrieve map outputs.

Procedures 2.2.1-2.2.3 achieve the same functionality, but each has their pros and cons. In practical deployment settings, the user should choose the approach that is most appropriate for the application context and usage scenario. As mentioned above, in any of the three alternative implementations, the flow information is periodically transferred from the data collection agent 104 (residing on the NameNode or Job-Tracker or TaskTracker 102) in FIG. 1 to a middleware residing on a separate server. This architecture is illustrated in FIG. 3.

Figure 3:
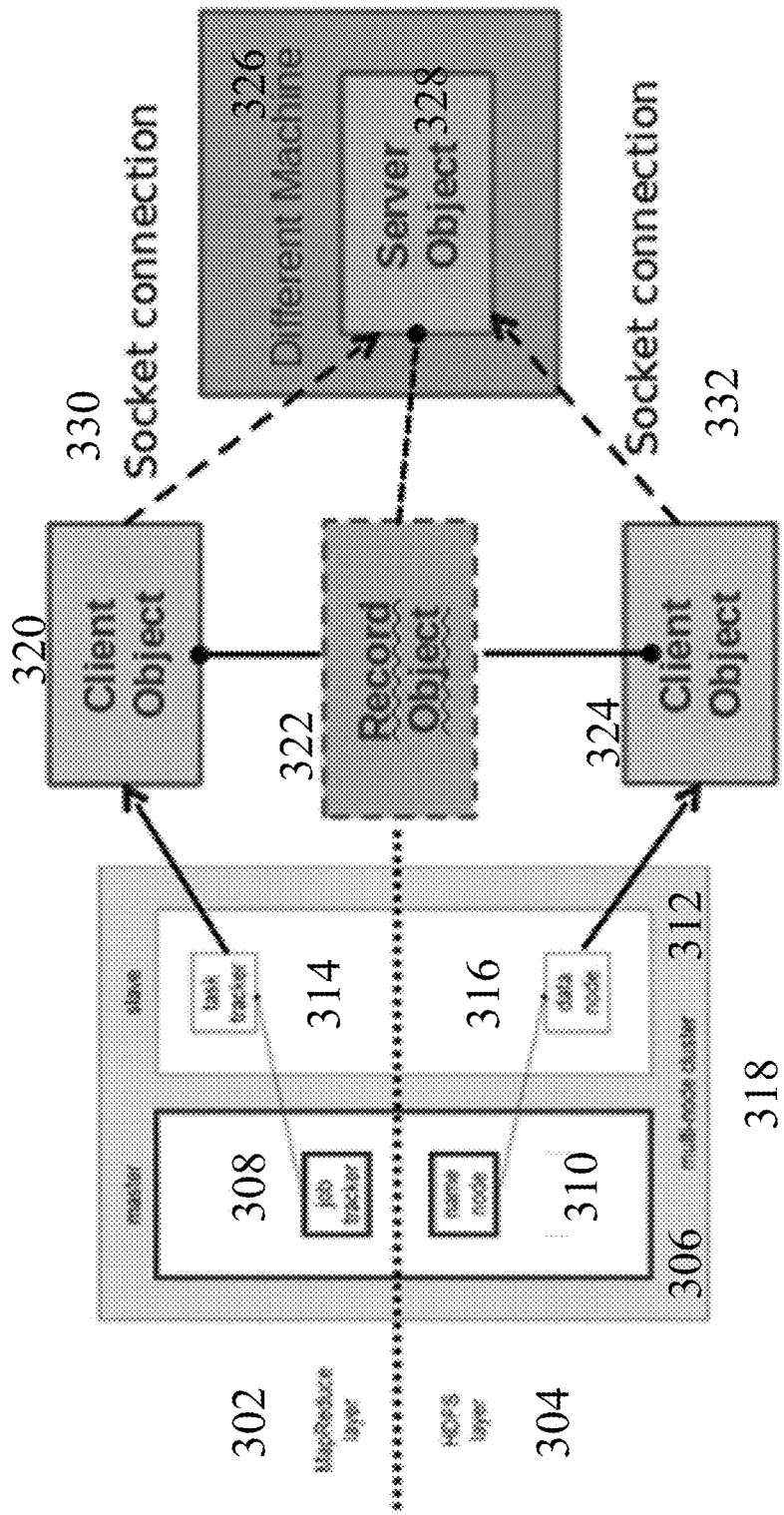
FIG. 3 depicts architecture for the middleware.

FIG. 3 presents architecture for FlowComb. The server on different machine 326 represents the FlowComb middleware. A client residing on each server in the Hadoop cluster 318 connects to the middleware server and provide information about upcoming data transfers.

This middleware aggregates the data transferred from distributed resources and performs real-time flow scheduling based on the obtained information. This middleware is called decision engine 132 in FIG. 1, which is elaborated below.

Procedure 3 (210): Decision Engine

This procedure assembles the information obtained in Procedure 2 (204) and adaptively reconfigures the routing to avoid network congestions. It has three components: network demand estimation, network hotspot detection, and network flow scheduling.

Procedure 3.1 (212): Network Demand Estimation

This procedure takes as input the flow source/destination information obtained from Procedure 2 (204), and translates it into the network traffic demand. Based on the additive increase multiplicative decrease (AIMD) behavior of TCP and the model of max-min fairness, we dynamically estimate the natural network demand of each source-destination pair.

Procedure 3.2 (214): Network Hotspot Detection

Based on natural network demand (from Procedure 3.1 (212)), this procedure determines which network link is congested. Each flow has its default route. Then for each network link, the decision engine simply sums up the natural demand of all flows traversing this link and examines whether the aggregate natural demand exceeds the capacity of the given link. If it does, we label this link as congested and invoke Procedure 3.3 (216) to resolve the congestion.

Procedure 3.3 (216): Network Flow Scheduling

In addition to flow source/destination information, the decision engine as extracts flow transfer status. Specifically, each flow has three timestamps, t_add, t_start, and t_end, respectively representing the time instant when a future flow is inferred (i.e., added to the list), when the transfer actually takes place, and when the transfer terminates. Based on the three timestamps, we can determine the status of a given flow.

If t_add !=Φ, and t_start =t_end=Φ, the flow is just detected, but the transfer has not started yet. This type of flows are labeled as "Pending." Pending flows have the lowest priority and can be scheduled arbitrarily.

If t_add !=Φ, t_start !=Φ, and t_end=Φ, the flow transfer has started. We label this type of flows as "Active." Pending flows have the highest priority and should be scheduled first.

If t_end !=Φ, the flow transfer has finished. We label this type of flows as "Terminated." Terminated flows should be removed from the list of flows to be scheduled and their natural network demand should be removed from all intermediate links.

Figure 4:
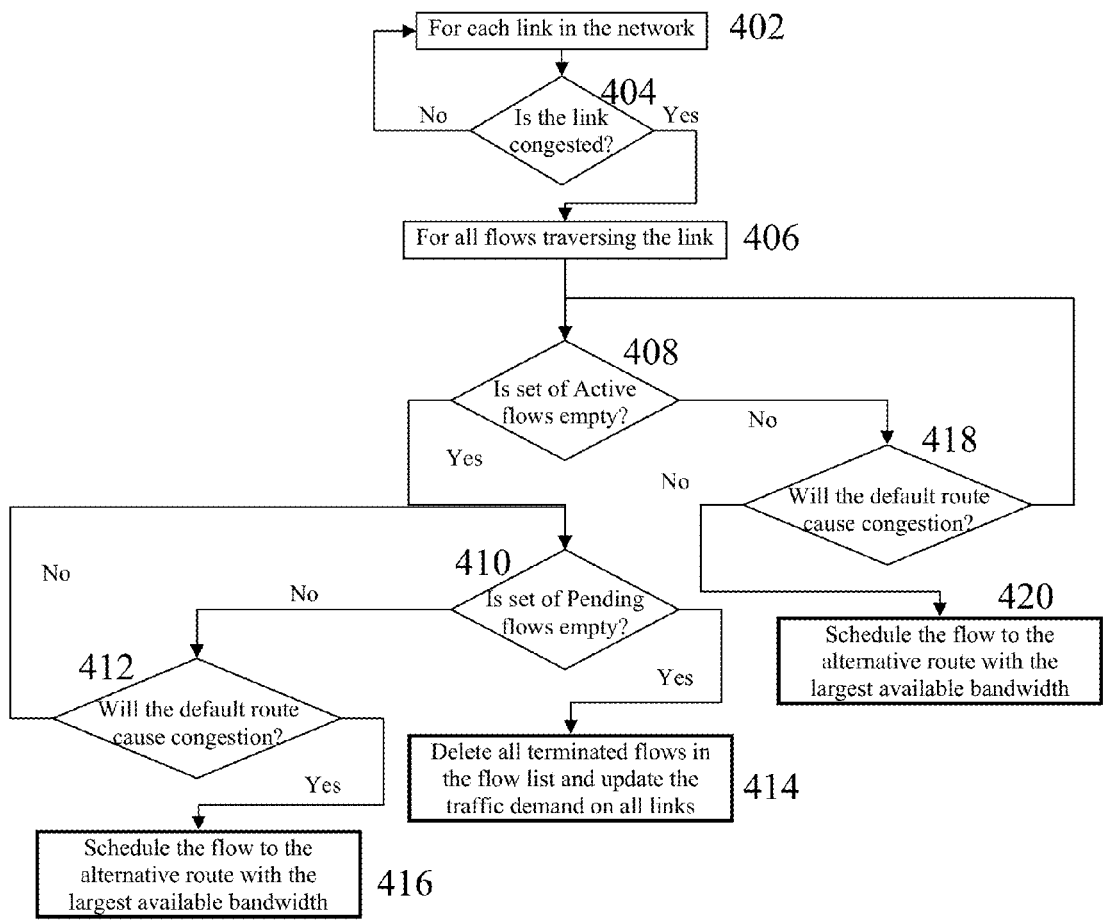
FIG. 4 depicts a flow scheduling mechanism.

Then, the flow scheduling mechanism is illustrated in FIG. 4.

Procedure 4 (218): Rule Management

The rule management takes as input a pair of endpoints (specified by their IP addresses and possibly application port numbers) and a list of switches that the traffic between the endpoints should traverse. It creates a set of OpenFlow rules that will be installed in each of the switches and which will be used to route the traffic between the two endpoints. Each rule contains a match part (used to match the rule only against packets between the two endpoints) and an action part (used to forward traffic to the next switch on the path). If a rule that matches the traffic between the endpoints already exists on the switch then the rule manager has two options: a) if the action of the existing rule forwards the traffic to the next switch in the input path, then the rule manager does nothing; b) if the existing rule has a different action, then the rule manager replaces it with the current rule.

Figure 5:
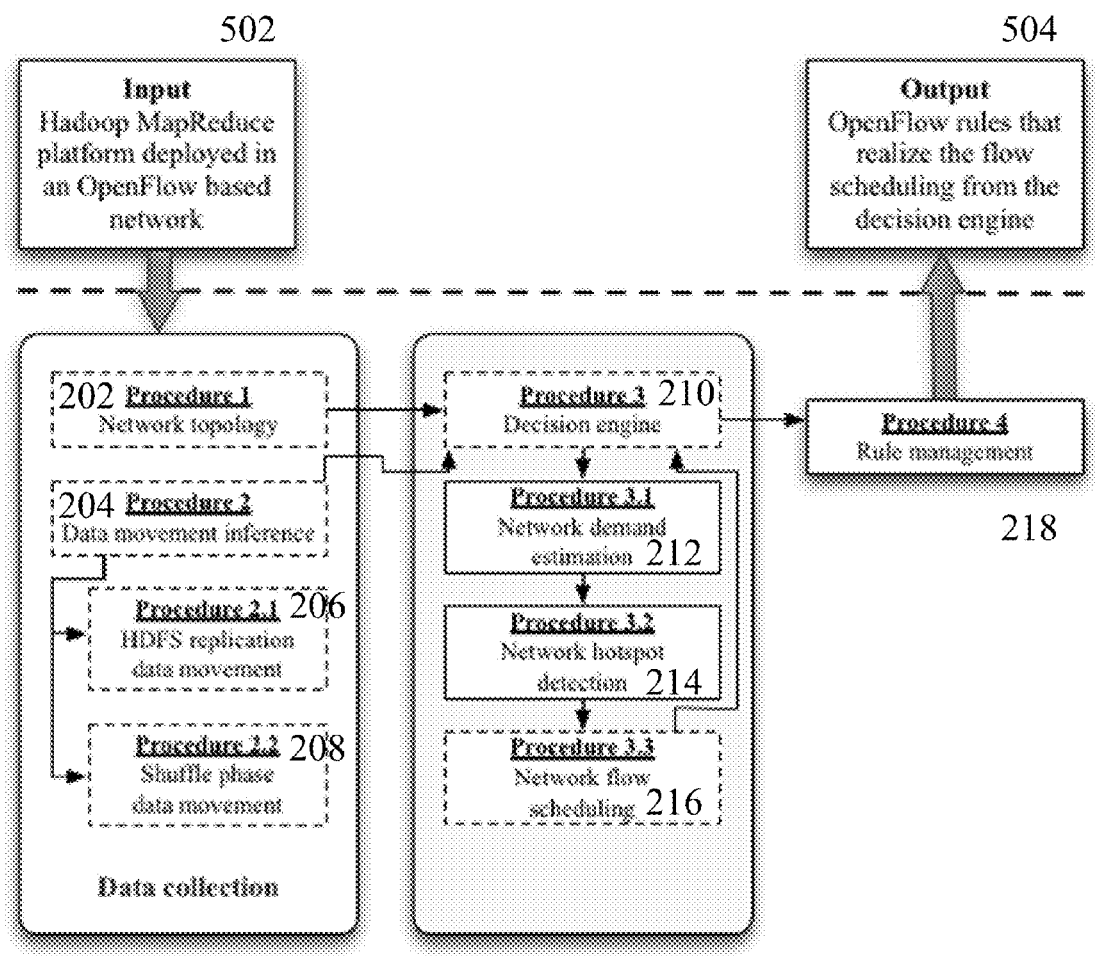
FIG. 5 depicts another process carried out by FlowComb.

FIG. 5 illustrates another example for FlowComb. Procedures 1, 2, 2.1-2.2, 3, 3.1-3.3, and 4 are similar to those in FIG. 2. FIG. 5 explicitly shows input 502 and output 504. Input 502 is provided by Hadoop MapReduce platform deployed in, for example, an OpenFlow based network. Output 504 is, for example, OpenFlow rules that realize the flow scheduling from decision engine 132 in FIG. 1.

Procedure 1 (202), Procedure 2 (204) and Procedure 3 (210) (especially Procedure 3.3 (216)) may, when combined together, be capable of performing adaptive flow scheduling based on estimated network traffic demand to proactively avoid network congestion and application performance degradation. This is significantly different from and improves all existing approaches, which perform Hadoop job scheduling with very limited consideration of network traffic situation.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

What is claimed is:

1. A method implemented in a network apparatus used in a network, the method comprising:
 collecting information about network topology from a network controller;
 collecting information about data movement;
 deciding routing in the network according to the information about network topology and the information about data movement; and
 providing information about the routing to the network controller,
 wherein the network controller enforces the routing in the network, wherein the information about data movement comprises shuffle phase data movement, and wherein the information about data movement is collected during the shuffle phase data movement by:
  modifying a reduce task code,
  modifying a JobTracker code, or
  running an agent continuously scanning a log file.

2. The method as in claim 1, wherein the network comprises a software defined network or an OpenFlow network.

3. The method as in claim 1, wherein the information about network topology is inferred by:
  sending Link Layer Discovery Protocol (LLDP) packets from a switch; and
  examining rules installed in the switch.

4. The method as in claim 1, wherein the information about data movement comprises Hadoop Distributed File System (HDFS) related data movement.

5. The method as in claim 1, wherein the routing in the network is decided by:
  estimating network demand;
  detecting a network hotspot; and
  scheduling a network flow.

6. The method as in claim 1, wherein the information about the routing comprises:
  a pair of endpoints; and
  a list of one or more switches that traffic between the pair of endpoints traverses.

7. The method as in claim 6, wherein the network controller creates a set of network rules to be installed in each switch.

8. The method as in claim 7, wherein each network rule includes:
  a match part used to match said each rule against packets between the pair of endpoints; and
  an action part used to forward traffic to a next switch on a path.

9. A non-transitory computer readable medium storing a program causing a computer to execute a process including:
  collecting information about network topology from a network controller;
  collecting information about data movement;
  deciding routing in the network according to the information about network topology and the information about data movement; and
  providing information about the routing to the network controller,
  wherein the network controller enforces the routing in the network,
  wherein the information about data movement comprises shuffle phase data movement, and
  wherein the information about data movement is collected during the shuffle phase data movement by:
    modifying a reduce task code,
    modifying a JobTracker code, or
    running an agent continuously scanning a log file.

10. The non-transitory computer readable medium as in claim 9, wherein the network comprises a software defined network or an OpenFlow network.

11. The non-transitory computer readable medium as in claim 9, wherein the information about network topology is inferred by:
  sending Link Layer Discovery Protocol (LLDP) packets from a switch; and
  examining rules installed in the switch.

12. The non-transitory computer readable medium as in claim 9, wherein the information about data movement comprises Hadoop Distributed File System (HDFS) related data movement.

13. The non-transitory computer readable medium as in claim 9, wherein the routing in the network is decided by:
  estimating network demand;
  detecting a network hotspot; and
  scheduling a network flow.

14. The non-transitory computer readable medium as in claim 9, wherein the information about the routing comprises:
  a pair of endpoints; and
  a list of one or more switches that traffic between the pair of endpoints traverses.

15. A network comprising:
  a network apparatus; and
  a network controller,
  wherein the network apparatus collects information about network topology from the network apparatus, collects information about data movement, decides routing in the network according to the information about network topology and the information about data movement, and provides information about the routing to the network controller,
  wherein the network controller provides the information about network topology, creates a set of network rules to be installed in each switch according to information about the routing, and enforces the routing in the network,
  wherein the information about data movement comprises shuffle phase data movement, and
  wherein the information about data movement is collected during the shuffle phase data movement by:
    modifying a reduce task code,
    modifying a JobTracker code, or
    running an agent continuously scanning a log file.

* * * * *